United States Patent [19]

Schmalstieg et al.

[11] Patent Number: 5,510,432
[45] Date of Patent: Apr. 23, 1996

[54] MIXED BLOCKED ISOCYANATE PREPOLYMERS, A PROCESS FOR THEIR PRODUCTION AND THEIR USE FOR THE PRODUCTION OF FLEXIBLE EPOXY RESIN SYSTEMS

[75] Inventors: Lutz Schmalstieg, Cologne; Rainer Rettig, Kürten; Eberhard König, Leverkusen, all of Germany

[73] Assignee: Bayer Aktiengesellschaft, Pittsburgh, Pa.

[21] Appl. No.: 454,796

[22] Filed: May 31, 1995

[30] Foreign Application Priority Data

Jun. 22, 1994 [DE] Germany ............ 44 21 816.8

[51] Int. Cl.⁶ ............ C08L 63/00; C08L 75/08; C08G 18/80; C07D 231/12
[52] U.S. Cl. ............ 525/528; 528/45; 528/49; 528/52; 528/60; 528/61; 528/68; 528/73; 528/116; 528/124; 528/407; 528/418; 528/421; 548/374.1; 548/375.1; 560/25; 560/26; 560/358; 564/48; 564/50; 564/52
[58] Field of Search ............ 525/528; 528/45, 528/49, 52, 60, 61, 68, 73, 116, 124, 407, 418, 421; 548/374.1, 375.1; 560/25, 26, 358; 564/48, 50, 52

[56] References Cited

U.S. PATENT DOCUMENTS

| | | | |
|---|---|---|---|
| 4,008,247 | 2/1977 | Tucker | 548/361 |
| 4,623,731 | 11/1986 | Ivanov et al. | 548/374 |
| 4,797,494 | 1/1989 | Ivanov et al. | 548/374 |
| 4,904,781 | 2/1990 | Ivanov et al. | 544/222 |
| 4,976,837 | 12/1990 | Hughes et al. | 204/181.7 |
| 5,034,495 | 7/1991 | Hansen et al. | 528/111 |
| 5,138,011 | 8/1992 | Markusch et al. | 528/45 |
| 5,210,169 | 5/1993 | Mühlebach et al. | 528/45 |
| 5,391,681 | 2/1995 | Mühlebach et al. | 528/45 |

FOREIGN PATENT DOCUMENTS 1399257  7/1975  United Kingdom.

*Primary Examiner*—James J. Seidleck
*Assistant Examiner*—Rabon Sergent
*Attorney, Agent, or Firm*—Joseph C. Gil; Lyndanne M. Whalen

[57] ABSTRACT

Isocyanate prepolymers based on an aromatic diisocyanate and a polyether polyol in which at least 95% of the isocyanate groups are blocked by blocking agents selected from A) about 50 to about 97 equivalent % of a phenol or substituted phenol, B) about 30 to about 50 equivalent % of a pyrazole or a substituted pyrazole and C) 0 to about 10 equivalent % of a blocking agent different from A) and B).

These blocked isocyanate prepolymers are particularly useful for the production of flexible epoxy resin systems.

6 Claims, No Drawings

MIXED BLOCKED ISOCYANATE PREPOLYMERS, A PROCESS FOR THEIR PRODUCTION AND THEIR USE FOR THE PRODUCTION OF FLEXIBLE EPOXY RESIN SYSTEMS

BACKGROUND OF THE INVENTION

The present invention relates to new isocyanate prepolymers having predominantly or exclusively blocked isocyanate groups in which at least two different blocking agents are present, a process for their production and their use for the production of flexible epoxy resin systems.

Synthetic resins based on epoxy resins have a number of advantageous properties. Such desirable properties include, for example, good adhesion to organic and inorganic substrates, good solvent resistance and high resistance to chemicals. However, due to their high cross-linking density, amine-cured epoxy resins (particularly those based on diphenylolpropane (bisphenol A) and epichlorohydrin) are often brittle, having glass transition regions above 20° C. Consequently, these synthetic resins do not generally meet the impact strength, shock resistance and high flexibility requirements for many applications. This is particularly true with respect to construction applications where durable bridging of shrinkage cracks (e.g., in concrete) is necessary.

The elasticity of these resins can be increased internally to a certain extent by reducing the cross-linking density and externally by adding softeners.

External elasticizers such as tar, phthalate esters, high-boiling alcohols and vinyl polymers are unreactive and are not incorporated into the duromer network. They bring about expansion solely by occupying space. Internal elasticizing through reduction of the cross-linking density can be achieved by reducing the functionality of the curing agent. Longchain, low-functional aminoamides based on dimerized fatty acids have been successfully used to reduce crosslinking density. However, these aminoamides cannot be employed in all application areas due to insufficient elasticizing.

A good and lasting elasticizing of epoxy resins can be achieved by combination of the resin with a polyurethane. Elasticized plastics composed of epoxy resins, polyfunctional carbamate aryl esters and polyamines are described, for example, in DE-AS 2,152,606 but the plastics thus prepared do not satisfy all of the practical requirements for such materials. More specifically, the carbamate aryl esters described in DE-AS 2,152,606 have a very high viscosity. Therefore, in many cases they have to be processed with added softeners. Further, the mechanical properties of these prior art plastics do not meet the technical requirements for many applications.

SUMMARY OF THE INVENTION

It is an object of the present invention to provide novel blocked isocyanate prepolymers.

It is also an object of the present invention to provide blocked isocyanate prepolymers which are useful for the production of flexible epoxy resin systems which have mechanical properties that satisfy the requirements for many practical applications and which have lower viscosities than prior art materials.

It is another object of the present invention to provide a process for the production of blocked isocyanate prepolymers which are useful in the production of flexible epoxy resins having improved properties.

It is a further object of the present invention to provide a process for the production of flexible epoxy resin systems.

These and other objects which will be apparent to those skilled in the art are accomplished by reacting (a) an aromatic diisocyanate with (b) a polyether polyol having an average hydroxyl functionality of from about 1.5 to about 4 and (c) a combination of at least two blocking agents. The blocking agents are selected from (A) phenols and substituted phenols, (B) pyrazoles and substituted pyrazoles and optionally (C) other known blocking agents which are outside the scope of (A) and (B). The phenol or substituted phenol blocking agent may be used in an amount of from about 50 to about 97 equivalent percent, based on the total amount of blocking agents employed. The pyrazole or substituted pyrazole blocking agent may be used in an amount of from about 3 to about 50 equivalent percent, based on the total amount of blocking agents employed. The optional blocking agent (C) may be used in an amount of from 0 to about 10 equivalent percent, based on the total amount of blocking agents employed. The prepolymer formed by this reaction has at least 95% of its isocyanate groups blocked with blocking agent. From about 1.3 to about 7% of the total weight of this prepolymer is the sum of the weight of any free isocyanate groups plus the weight of the blocked isocyanate groups. The blocked isocyanate prepolymers of the present invention may be combined with an epoxy resin and an organic polyamine and then cured to form an epoxy resin composition.

DETAILED DESCRIPTION OF THE PRESENT INVENTION

The present invention is directed to isocyanate prepolymers based on aromatic diisocyanates and polyether alcohols having an (average) hydroxyl functionality of from about 1.5 to about 4. At least 95% of the isocyanate groups of this prepolymer are blocked by blocking agents. The total content of free and blocked isocyanate groups (calculated as NCO) is from about 1.3 to about 7% by weight. The blocking agent used to produce the blocked isocyanate prepolymers of the present invention is made up of (A) from about 50 to about 97 equivalent percent of at least one phenol or substituted phenol, (B) from about 3 to about 50 equivalent percent of at least one pyrazole or substituted pyrazole, and (C) from 0 to about 10 equivalent percent of one or more blocking agents different from (A) and (B), with the total percentage of (A), (B) and (C) being 100.

The present invention also relates to a process for the production of isocyanate prepolymers containing isocyanate groups having an NCO content of from about 1.4 to about 8.5% by weight. These isocyanate prepolymers are based on polyether polyols having an (average) hydroxyl functionality of from about 1.5 to about 4. At least 95 equivalent percent of the isocyanate groups of these prepolymers are blocked with blocking agents which include:

(A) from about 50 to about 97 equivalent percent of a phenol or a substituted phenol, (B) from about 3 to about 50 equivalent percent of a pyrazole or a substituted pyrazole, and (C) from 0 to about 10 equivalent percent of other blocking agents which are different from (A) and (B), with the total amount of blocking agents being 100 equivalent percent.

The present invention also relates to a proceeds for the production of flexible epoxy resin systems from the isocyanate prepolymers of the present invention.

The use of substituted pyrazoles as blocking agents has already been disclosed in DE-OS 3,403,436 and EP-A 0,159,117. Each of these publications describes one-component systems which cure to form polymeric coatings only when exposed to elevated temperatures. Neither publication suggests that certain pyrazole-blocked polyisocyanates would be curable by polyamines at room temperature. Moreover, there is no indication in either of these disclosures that the disclosed pyrazoles should be combined with a phenolic blocking agent.

The isocyanate prepolymers on which the blocked polyisocyanates of the present invention are based are reaction products of aromatic polyisocyanates with polyether polyols containing urethane groups and having an NCO content of from about 1.4 to about 8.5% by weight, preferably from about 1.6 to about 5% by weight.

Any of the known aromatic polyisocyanates may be used to prepare the prepolymers and blocked polyisocyanates of the present invention. Diisocyanates having molecular weights in the range of from about 174 to about 300 are preferred. Specific examples of preferred diisocyanates include: 2,4-diisocyanatotoluene and technical mixtures thereof in which preferably up to 35% by weight, based on the mixture is 2,6-diisocyanatotoluene; 4,4'-diisocyanatodiphenylmethane and technical mixtures thereof with 2,4'- and optionally 2,2'-diisocyanatodiphenylmethane and/or its higher homologs. Diisocyanatotoluene is particularly preferred.

The polyether polyols useful for the production of the isocyanate prepolymers employed in the practice of the present invention have an (average) molecular weight, calculated from the hydroxyl functionality and hydroxyl group content, of from about 800 to about 10,000, preferably from about 1,000 to about 6,000, and an (average) hydroxyl functionality of from about 1.5 to about 4, preferably from about 2 to about 4. They may be prepared in known manner by alkoxylation of the appropriate starter molecules, preferably using ethylene oxide and/or propylene oxide in any order or combination in the course of the alkoxylation reaction.

Suitable starter molecules are low-molecular weight compounds containing primary or secondary amino groups and/or hydroxyl groups which when alkoxylated will produce a polyol having an average hydroxyl functionality of from about 1.5 to about 4. Specific examples of suitable starter molecules include: water, ethanol, ethylene glycol, propylene glycol, trimethylo-propane, glycerol, pentaerythritol, sorbitol, ethylenediamine or any mixtures of such starter molecules which will produce a polyol having an average hydroxyl functionality of from about 1.5 to about 4 when alkoxylated. The polyether polyols may also be mixtures of polyether polyols prepared separately and then mixed, provided that such mixtures have an average molecular weight of from about 800 to about 10,000 and an average hydroxyl functionality of from about 1.5 to about 4.

To prepare isocyanate prepolymers useful in the practice of the present invention, polyisocyanates such as those identified above are reacted with polyether polyols such as those identified above to form. urethane groups while maintaining an NCO/OH equivalent ratio of from about 1.8:1 to about 10:1. This reaction is generally carried out within the temperature range of from about 40 to about 100° C.

The nature and proportions of the starting components and the NCO/OH equivalent ratio are selected from the above-described materials and equivalent ratios so that isocyanate prepolymers are formed having an NCO content of from about 1.4 to about 8.5%. A lower NCO/OH ratio of, for example, from about 1.5:1 to about 2.5:1 is used if a chain extending reaction is desired. Otherwise an isocyanate excess, that is, an NCO/OH equivalent ratio of from about 5:1 to about 10:1, is often used. When an isocyanate excess is used, it is preferred that the excess starting isocyanate be removed upon completion of the prepolymer formation by distillation if the isocyanate is distillable (e.g., by thin film distillation). Where non-distillable starting isocyanates remain in the prepolymer, the excess starting isocyanate may also be removed by extraction using suitable solvents such as, for example, cyclohexane or isooctane.

The blocking agents used in the practice of the present invention are preferably employed in a total quantity such that at least 95, most preferably from about 97 to about 100 equivalent percent of the total equivalents of NCO groups present in the isocyanate prepolymer are blocked. The blocking agent composition of the present invention is generally made up of (A) from about 50 to 97 equivalent %, preferably from about 60 to about 95 equivalent %, of a phenol or substituted phenol, (B) from about 3 to about 50 equivalent %, preferably from about 5 to about 40 equivalent %, of a pyrazole or substituted pyrazole and (C) from 0 to about 10 equivalent %, preferably 0 equivalent % of blocking agent which is different from (A) and (B), with the total equivalent % of (A) plus (B) plus (C) being 100 equivalent %.

In principle, any compound having at least one phenolic OH group and which, except for this OH group, is inert to isocyanate groups, may be used as blocking agent (A). Particularly useful phenols include monohydric, $C_1$–$C_{18}$ alkyl-substituted phenols, preferably $C_6$–$C_{12}$ alkyl-substituted phenols, phenols having preferably an alkyl substituent or ester groups. Specific examples of suitable phenols include: phenol; the isomeric cresols; the isomeric xylenols; 2-sec-butylphenol; 4-tertbutylphenol; the isomeric nonylphenols; dodecylphenols; octadecylphenols; the isomeric alkyl hydroxybenzoates having from 1 to 18, preferably 1 to 4 carbon atoms in the alkyl radical; and mixtures of these phenols. Technical mixtures of nonylphenol isomers (hereinafter referred to as "isononylphenol") are particularly preferred.

Examples of the pyrazoles and substituted pyrazoles which are useful as blocking agent (B) include: pyrazole; 3-(5)methylpyrazole; and 3,5-dimethylpyrazole. Pyrazole and 3,5-dimethylpyrazole are particularly preferred.

Examples of the optional blocking agents (C) include: butanone oxime; ε-caprolactam; and secondary monoamines such as di-n-butylamine.

In the process of the present invention, it is preferred that blocking agent (A) be reacted first with the isocyanate prepolymer to be blocked. This reaction of the phenolic blocking agent and isocyanate prepolymer is carried out in known manner, preferably at a temperature of from about 50 to about 120° C, optionally in the presence of a catalyst until the calculated NCO content is attained. Any of the catalysts known to be useful in such blocking reactions may be used. The pyrazole blocking agent (B) may then be added in portions. The temperature is maintained within the range of from about 20 to about 100° C, preferably from about 20 to about 60° C during the addition of this blocking agent.

It is also possible, but less preferred, to react the isocyanate prepolymer with the pyrazole blocking agent (B) before the isocyanate prepolymer is reacted with the phenolic blocking agent (A).

Where an optional blocking agent (C) is used, blocking agent (C) may be reacted with the isocyanate prepolymer at any point, optionally mixed with blocking agent (A) or (B).

The advantage to reacting the isocyanate prepolymer with the phenolic blocking agent (A) first and then with blocking agent (B) is that the less reactive blocking agent is reacted first and the NCO groups still remaining react with the more reactive blocking agent. This makes it possible to achieve virtually complete blocking of the isocyanate groups without the need to use an excess of blocking agents.

The reaction of isocyanate prepolymer with blocking agent composition is carried out preferably in the solid state. But the use of organic solvents or softeners is, in principle, also possible. Examples of suitable solvents include: n-butyl acetate; methoxypropyl acetate; toluene; xylene; and higher aromatic solvent mixtures which are commercially available (e.g., Solvesso solvent which is marketed by Exxon Chemie).

The predominantly or completely blocked isocyanate prepolymers of the present invention are characterized by a total content of unblocked and blocked aromatic isocyanate groups (calculated as NCO) of from about 1.3 to about 7% by weight, preferably from about 1.5 to about 4% by weight. The blocked polyisocyanate prepolymers of the present invention surprisingly have distinctly lower viscosities than do the corresponding exclusively phenol-blocked products of prior art.

In combination with organic polyamines, the blocked prepolymers of the present invention cure within a day to form elastic non-adhesive plastics. Any organic polyamine having a molecular weight within the range of from about 60 to about 1000, preferably from about 60 to about 500, which has a total of at least two primary and/or secondary amino groups per molecule (preferably, two primary amino groups per molecule) may be used in this reaction. Specific examples of suitable polyamines include: ethylenediamine, 1,2-diaminopropane, 1,3-diaminopropane, 1,4-diaminobutane, 1,6-diaminohexane, and 2,2,4- and/or 2,4,4-trimethylhexamethylenediamine. Polyamines which in addition to two or more primary amino groups also have secondary amino groups such as diethylenetriamine or triethylenetetramine may also be used.

Plastics which are prepared by reacting the blocked isocyanate prepolymers of the present invention with diamines having one or more cycloaliphatic rings and a molecular weight within the range of from about 60 to about 1000 are particularly preferred. Examples of suitable diamines having at least one cycloaliphatic ring include: 1,4-diaminocyclohexane; 4,4'-diaminodicyclohexylmethane; 1,3-diaminocyclopentane; 4,4'-diaminodicyclohexylpropane-2,2; 4-isopropyl- 1,2-diaminocyclohexane; 3,3'-diaminodicyclohexylpropane-2,2; 3,3'-dimethyl-4,4'-diaminodicyclohexylmethane; 3-aminomethyl-3,3,5-trimethylcyclohexylamine (isophorone diamine); and technical bis-aminomethyltricyciodecane (which is commercially available under the name "TCD-Diamin" from Hoechst AG). Aminopolyethers having a molecular weight within the above-given ranges and having on statistical average from 2 to 3 terminal primary amino groups per molecule such as those which are commercially available under the trademark Jeffamine (Texaco) may also be used to produce plastics from the blocked isocyanate prepolymers of the present invention.

The plastics obtained by cross-linking of the blocked poly-isocyanate prepolymers of the present invention have better mechanical properties than do plastics produced from comparable exclusively phenol-blocked systems of the prior art.

In practice, the blocked polyisocyanate prepolymers of the present invention are primarily used in three-component systems made up of epoxy resins, polyamines and the blocked polyisocyanate prepolymers. Mixtures of this type may be cured under either hot or cold conditions.

Epoxy resins useful in such three-component systems generally contain, on average, more than one epoxide group per molecule. Suitable epoxy resins include: glycidyl ethers of polyhydric alcohols such as butanediol, hexanediol, glycerol, hydrogenated diphenylolpropane; and polyhydric phenols such as resorcinol, diphenylolpropane and phenolaidehyde condensates. The glycidyl ethers of polybasic carboxylic acids such as hexahydrophthalic acid or dimerized fatty acid may also be used.

Liquid epoxy resins based on epichlorohydrin and 2,2-diphenylol-propane (bisphenol A) and having a molecular weight of from about 340 to about 450 are particularly preferred. If desired, the viscosity of the mixtures can be lowered by including monofunctional epoxide compounds. The addition of such monofunctional epoxide compounds will also improve the pot life of the system. Examples of suitable monofunctional epoxide compounds include aliphatic and aromatic glycidyl ethers such as butyl glycidyl ether and phenyl glycidyl ether; glycidyl esters such as glycidyl acrylate; and epoxides such as styrene oxide and 1,2-epoxydodecane.

"Epoxy resin systems" which contain a blocked isocyanate prepolymer of the present invention, an epoxy resin and a polyamine (particularly a cycloaliphatic polyamine) cure to form high quality plastics when from about 0.4 to about 0.9 (preferably from about 0.5 to about 0.8) primary amino groups and from about 0.02 to about 0.5 (preferably from about 0.03 to about 0.4) blocked isocyanate groups per epoxy group are present.

Mixtures which are ready for use may be made by including any of the common auxiliary substances and additives such as fillers, pigments, reaction accelerators or viscosity regulators in epoxy resin systems made up of an epoxy resin, a polyamine and a blocked polyisocyanate of the present invention. Examples of such auxiliary substances and additives include: reaction accelerators such as salicylic acid, bis(dimethylamino- methyl)-phenol and tris(dimethylaminomethyl)-phenol; fillers such as sand, any of the powdered minerals, silica, powdered asbestos, kaolin, talc, powdered metal, tar, tar pitch, asphalts, cork granules, and polyamides; softeners such as phthalate esters; and viscosity regulators such as benzyl alcohol. Epoxy resin-curing agent combinations in which the blocked isocyanate prepolymers of the present invention are used or applied concomitantly as curing agents are suitable for the production of coatings, adhesives, sealants, and structural pads. These resins are characterized by good bonding, resistance to chemicals, high impact strength and shock resistance, improved flexibility and elasticity.

The following Examples serve to explain the invention further. All percentage data and the PO/EO ratio refer to percentage by weight.

EXAMPLES

Example 1

1000 g of a polyether triol having the OH number 28 (prepared by propoxylation of trimethylolpropane and subsequent ethoxylation of the propoxylation product (PO/EO ratio =83:17)) and 500 g of a polyether diol having the OH number 56 (prepared by propoxylation of propylene glycol), were reacted with 174 g of 2,4-diisocyanatotoluene for 5 hours at 80° C. to form a prepolymer in which the theoretical NCO content of 2.5% was attained.

154 g of a technical mixture of isomeric nonylphenols (isononylphenol) was then added to the prepolymer and reacted in the presence of 0.4 g of tin(II) octoate while stirring for 6 hours at 60° C. 20 g of solid pyrazole were then added and the mixture was stirred for a further 30 minutes at 60° C. A total of 99 equivalent %, based on the isocyanate groups of the prepolymer, of blocking agents were used. The blocked isocyanate prepolymer thus obtained had the following characteristic data:

Blocked NCO content: 2.25% (calculated)

Viscosity (22° C): 49,000 mPa.s 187 g of the prepolymer were homogeneously mixed with 11.9 g of 3,3'-dimethyl-4,4'-diaminodicyclohexylmethane. The mixture cured overnight at ambient temperature to form a clear, elastic plastic having the following mechanical properties:

Shore A hardness: 65

Elongation at tear: 1050%

Breaking strength: 4.7 N/mm$^2$

Tear strength: 17N/mm

Example 2

1000 g of the same polyether triol which was used in Example 1 and 1000 g of a polyether diol having the OH number 28 (prepared by propoxylation of propylene glycol and subsequent ethoxylation of the propoxylation product (PO/EO ratio =80:20)) were reacted with 174 g of 2,4-diisocyanatotoluene for 5 hours at 80° C. to form a prepolymer having the theoretical NCO content of 1.9%. 176 g of isononylphenol were then added, the mixture was catalyzed using 0.5 g of tin(II) octoate and stirred for 6 hours at 60° C. 19 g of solid 3,5-dimethylpyrazole were then added and the mixture was stirred for an additional 30 minutes at 60° C. A total of 100 equivalent %, based on the isocyanate groups of the prepolymer, of blocking agents were used. The blocked isocyanate prepolymer thus obtained had the following characteristic data:

Blocked NCO content: 1.7% (calculated)

Viscosity (22° C): 39,000 mPa.s 247 g of this prepolymer were homogeneously mixed with 11.9 g of 3,3'-dimethyl-4,4'-diaminodicyclohexylmethane. The mixture cured overnight at ambient temperature to form a clear, elastic plastic having the following mechanical properties:

Shore A hardness: 61

Elongation at tear: 1500%

Breaking strength: 3.9 N/mm$^2$

Tear strength: 20 N/mm

Example 3

1000 g of the same polyether diol which was used in Example 2 and 800 g of a polyether triol having the OH number-35 (prepared by propoxylation of trimethyloipropane and subsequent ethoxylation of the propoxylation product (PO/EO ratio 87:13)) were reacted with 174 g of 2,4-diisocyanatotoluene for 5 hours at 80° C. to form a prepolymer having the theoretical NCO content of 2.1%. 176 g of isononylphenol were then added, the mixture was catalyzed using 0.4 g of tin(11) octoate and stirred for 6 hours at 60° C. 13 g of solid pyrazole were then added and the mixture was stirred for an additional 30 minutes at 60° C. A total of 99 equivalent %, based on the isocyanate groups of the prepolymer, of blocking agents were used. The blocked isocyanate prepolymer thus obtained had the following characteristic data:

Blocked NCO content: 1.9%

Viscosity (22° C): 61,000 mPa.s 221 g of this prepolymer were then homogeneously mixed with 1.9 g of 3,3'-dimethyl-4,4'-diaminodicyclohexylmethane. The mixture cured overnight at ambient temperature to form a clear, elastic plastic having the following mechanical properties:

Shore A hardness: 54

Elongation at tear: 1050%

Breaking strength: 2.8 N/mm$^2$

Tear strength: 18 N/mm

Example 4 (Comparative)

The NCO prepolymer corresponded to that produced in Example 1. This prepolymer was blocked exclusively with isononylphenol as follows: 1674 g of the NCO prepolymer together with 248 g of isononylphenol and 0.4 g of tin(II) octoate were stirred for 7 hours at 60° C. 113 equivalent %, based on isocyanate groups of the prepolymer, of blocking agent were used.

The blocked isocyanate prepolymer thus obtained had the following characteristic data:

Blocked NCO content: 2.2%

Viscosity (22° C): 78,000 mPa.s 193 g of this prepolymer were then homogeneously mixed with 11.9 g of 3,3'-dimethyl-4,4'-diaminodicyclohexylmethane. The mixture cured overnight at ambient temperature to form a clear, elastic plastic having the following mechanical properties:

Shore A hardness: 63

Elongation at tear: 190%

Breaking strength: 3.4 N/mm$^2$

Tear strength: 14 N/mm

Example 5

(Production of an elasticized epoxy resin)

100 g of the blocked prepolymer from Example 1 and 100 g of a commercially available epoxy resin made up of bisphenol A and epichlorohydrin and having an average molecular weight of 380 were homogeneously mixed with 37.5 g of 3,3'-dimethyl-4,4'-diaminodicyclohexylmethane. The mixture cured overnight to form an impact-resistant plastic having a Shore D hardness of 70.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate prepolymer which is the reaction product of
   (1) an aromatic diisocyanate and
   (2) a polyether polyol having an average hydroxyl functionality of from about 1.5 to about 4, in which at least 95 equivalent % of the isocyanate groups are blocked with a blocking agent composition made up of
      (A) from about 50 to about 97 equivalent % of a phenol or substituted phenol, (B) from about 3 to about 50 equivalent % of a pyrazole or a substituted pyrazole, and (C) from 0 to about 10 equivalent % of a blocking agent which is different from (1) and (2) with the sum of (A) plus (B) plus (C) totalling 100 and from about 1.3 to about 7% of the total weight of the prepolymer is the sum of the weight of free isocyanate groups plus the weight of the blocked isocyanate groups.

2. The isocyanate prepolymer of claim 1 in which the blocking agent composition is made up of (A) from about 50 to about 97 equivalent % of isononylphenol and (B) from about 3 to about 50 equivalent % of pyrazole and/or 3,5-dimethylpyrazole.

3. The isocyanate prepolymer of claim 1 in which the blocking agent composition is made up of (A) from about 60 to about 95 equivalent % of isononylphenol and (B) from about 5 to about 40 equivalent % of pyrazole and/or 3,5-dimethylpyrazole.

4. A process for the production of a blocked isocyanate prepolymer comprising 1) reacting
   a) an aromatic diisocyanate with
   b) a polyether polyol having an average hydroxyl functionality of from about 1.5 to about 4 to form a prepolymer which has an isocyanate group content of from 1.4 to 8.5% by weight, and 2) blocking at least 95 equivalent % of the isocyanate groups present in the prepolymer produced in step 1) with a blocking agent composition made up of (A) from about 50 to about 97 equivalent % of a phenol or a substituted phenol, (B) from about 3 to about 50 equivalent % of a pyrazole or a substituted pyrazole, and (C) from 0 to about 10 equivalent % a of blocking agent which is different from (A) and (B), with the total equivalent % of (A) plus (B) plus (C) being equal to 100.

5. A process for the production of a flexible plastic comprising combining the prepolymer of claim 1 with an organic polyamine and allowing the prepolymer and polyamine to react.

6. A process for the production of an epoxy resin composition comprising a) combining
   1) the blocked isocyanate prepolymer of claim 1,
   2) an epoxy resin, and
   3) an organic polyamine having a molecular weight of from about 60 to about 1000 and at least two primary or secondary amino groups per molecule, and b) allowing the mixture formed in a) to cure.

* * * * *

UNITED STATES PATENT AND TRADEMARK OFFICE
CERTIFICATE OF CORRECTION

PATENT NO. : 5,510,432  
DATED : April 23, 1996  
INVENTOR(S) : Lutz Schmalstieg et al Page 1 of 2

It is certified that error appears in the above-indentified patent and that said Letters Patent is hereby corrected as shown below:

At column 2, line 65, correct "relates to a proceeds" to "relates to a process".

At column 3, line 47, correct "trimethylo-propane" to "trimethylol-propane".

At column 4, line 4, correct "5:1" to "2.5:1".

At column 5, line 52, correct "bis-aminomethyltricyciodecane" to "bis-aminomethyltricyclodecane".

At column 6, lines 9-10, correct "phenolaidehyde" to "phenolaldehyde".

At column 6, line 49, correct "structural pads" to "structural parts".

UNITED STATES PATENT AND TRADEMARK OFFICE
CERTIFICATE OF CORRECTION

PATENT NO. : 5,510,432

DATED : April 23, 1996

INVENTOR(S) : Lutz Schmalstieg et al

It is certified that error appears in the above-identified patent and that said Letters Patent is hereby corrected as shown below:

At column 7, lines 58-59, correct "trimethyloipropane" to "trimethylolpropane".

At column 7, line 64, correct "tin(11) octoate" to "tin(II) octoate".

At column 8, line 7, correct "1.9 g" to "11.9 g".

Signed and Sealed this

Twenty-seventh Day of August, 1996

Attest:

BRUCE LEHMAN

Attesting Officer     Commissioner of Patents and Trademarks